(12) United States Patent
Dry et al.

(10) Patent No.: US 10,556,519 B2
(45) Date of Patent: Feb. 11, 2020

(54) VEHICLE CABIN CONFIGURING APPARATUS

(71) Applicant: Ford Global Technologies, LLC, Dearborn, MI (US)

(72) Inventors: Alan George Dry, Grosse Pointe Woods, MI (US); Johnathan Andrew Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 92 days.

(21) Appl. No.: 16/031,186

(22) Filed: Jul. 10, 2018

(65) Prior Publication Data

US 2020/0016999 A1 Jan. 16, 2020

(51) Int. Cl.
*B60N 2/07* (2006.01)
*B60N 2/08* (2006.01)

(52) U.S. Cl.
CPC ......... *B60N 2/0722* (2013.01); *B60N 2/0806* (2013.01)

(58) Field of Classification Search
CPC combination set(s) only.
See application file for complete search history.

(56) References Cited

U.S. PATENT DOCUMENTS

| | | | |
|---|---|---|---|
| 4,184,656 A | 1/1980 | Wakeley | |
| 4,530,481 A * | 7/1985 | Kluting | B60N 2/0705 248/394 |
| 5,368,355 A * | 11/1994 | Hayden | B60N 2/01591 296/65.13 |
| 6,270,140 B1 | 8/2001 | Opfer et al. | |
| 6,637,712 B1 * | 10/2003 | Lagerweij | B60N 2/0705 248/429 |
| 7,252,319 B2 | 8/2007 | Toyota et al. | |
| 8,152,231 B2 | 4/2012 | Larsen et al. | |
| 8,169,311 B1 | 5/2012 | Breed | |
| 8,382,057 B2 | 2/2013 | Napau et al. | |
| 9,248,759 B2 * | 2/2016 | Brand | B60N 2/14 |
| 9,376,044 B2 | 6/2016 | Fujita et al. | |
| 9,533,604 B2 * | 1/2017 | Nakashima | B60N 2/0722 |
| 9,688,164 B2 | 6/2017 | Vikstrom et al. | |
| 9,827,879 B2 * | 11/2017 | Fujita | B60N 2/0232 |
| 9,919,624 B2 * | 3/2018 | Cziomer | B60N 2/0875 |
| 10,040,373 B2 * | 8/2018 | Rawlinson | B60N 2/14 |
| 2009/0014584 A1 | 1/2009 | Rudduck et al. | |
| 2009/0108615 A1 * | 4/2009 | Akiya | B60N 2/01 296/65.03 |

(Continued)

FOREIGN PATENT DOCUMENTS

| DE | 69920043 T2 | 9/2005 |
|---|---|---|
| DE | 102009033797 A1 | 3/2010 |

(Continued)

*Primary Examiner* — Monica E Millner
(74) *Attorney, Agent, or Firm* — Vichit Chea; Price Heneveld LLP

(57) ABSTRACT

A vehicle cabin configuring apparatus includes a rail assembly and a seating assembly. The rail assembly includes a first channel that includes data and power connectors. The rail assembly also includes a second channel with a drive cable. The seating assembly includes a drive arm that is selectively engagable with the drive cable, locking pins that are selectively engagable with the rail assembly, and rollers that engage with a third channel of the rail assembly.

20 Claims, 12 Drawing Sheets

(56) References Cited

U.S. PATENT DOCUMENTS

| | | | |
|---|---|---|---|
| 2009/0195037 A1* | 8/2009 | Plavetich | B60N 2/01 297/257 |
| 2010/0001169 A1* | 1/2010 | Armo | B60N 2/06 248/636 |
| 2017/0166091 A1 | 6/2017 | Cziomer et al. | |
| 2018/0029558 A1* | 2/2018 | Beauchemin | B60R 22/18 |
| 2019/0126783 A1* | 5/2019 | Baccouche | B60N 2/0292 |

FOREIGN PATENT DOCUMENTS

| | | | |
|---|---|---|---|
| EP | 0615879 A1 | 9/1994 | |
| JP | WO2013161620 A1 | 12/2015 | |

* cited by examiner

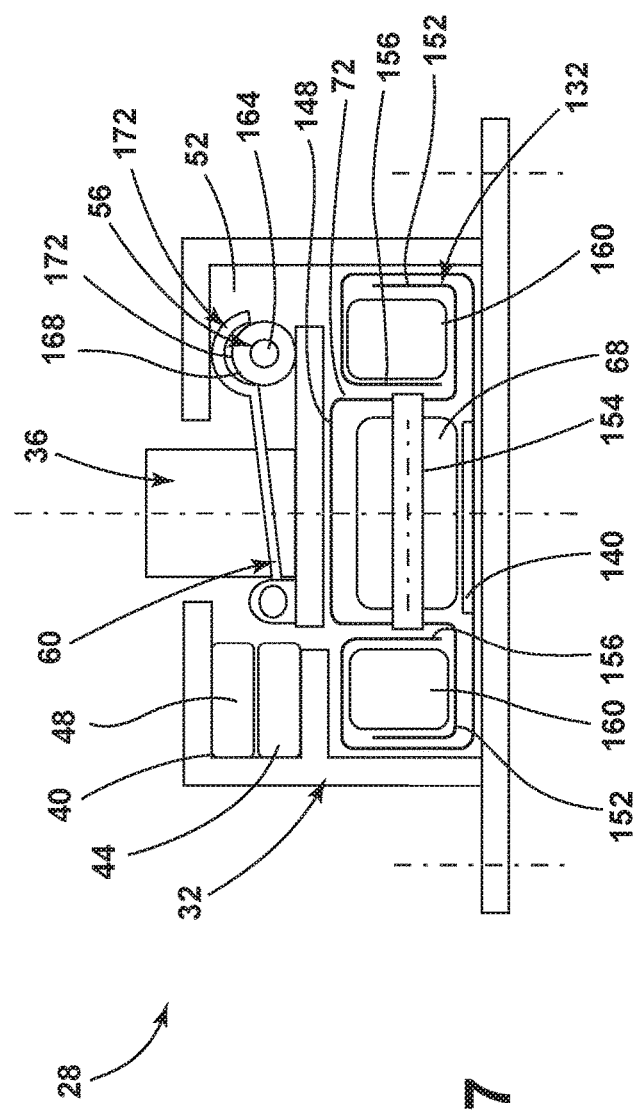
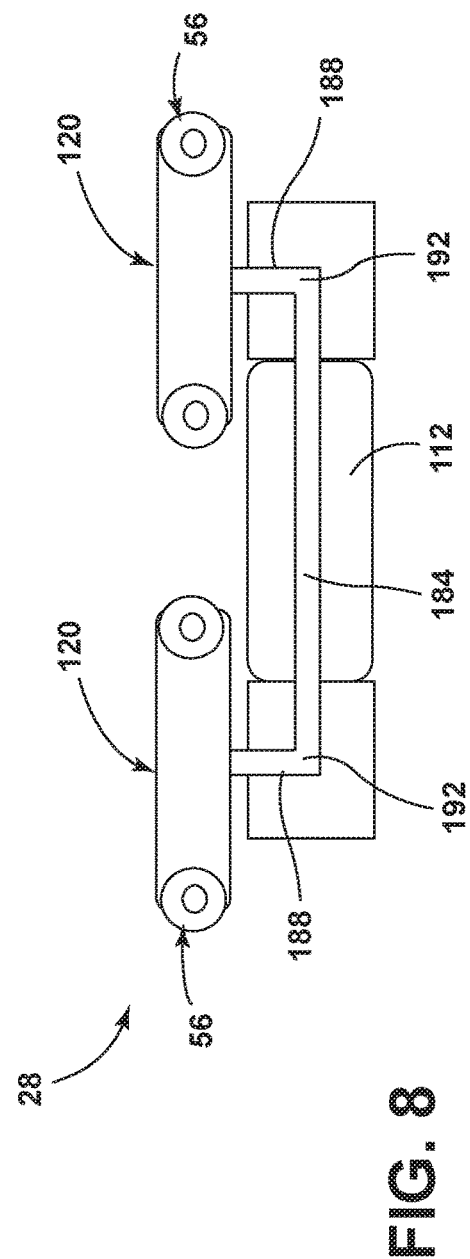
FIG. 7
FIG. 8

VEHICLE CABIN CONFIGURING APPARATUS

FIELD OF THE DISCLOSURE

The present disclosure generally relates to a cabin configuring apparatus. More specifically, the present disclosure relates to a cabin configuring apparatus for a vehicle.

BACKGROUND OF THE INVENTION

Vehicles are often provided with seating assemblies that can be adjusted for occupant comfort. Some seating assemblies in vehicles are capable of translation in fore-aft or side-to-side directions. However, there is a need for reconfigurable seating assemblies in vehicles that are capable of translation to various locations within a cabin of the vehicle, particularly with little to no physical exertion by a user.

SUMMARY OF THE INVENTION

According to a first aspect of the present disclosure, a vehicle cabin configuring apparatus includes a rail assembly and a seating assembly. The rail assembly includes a first channel that includes power connectors. The rail assembly also includes a second channel with a drive cable. The seating assembly includes a drive arm that is selectively engagable with the drive cable, locking pins that are selectively engagable with the rail assembly, and rollers that engage with a third channel of the rail assembly.

Embodiments of the first aspect of the present disclosure can include any one or a combination of the following features:
  the vehicle cabin configuring apparatus further includes glide bars positioned between the rail assembly and the seating assembly, wherein the glide bars decrease a coefficient of friction between the seating assembly and the rail assembly;
  the glide bars are coupled to the seating assembly such that the glide bars traverse the rail assembly with the seating assembly;
  the drive cable includes a first thickness and a second thickness alternately positioned therealong;
  the drive arm engages with at least one section of the first thickness of the drive cable and at least one section of the second thickness of the drive cable;
  the second thickness of the drive cable is greater than the first thickness of the drive cable, wherein the second thickness of the drive cable is a load-bearing section of the drive cable;
  the seating assembly further includes a track bracket that engages with the rail assembly and is generally sinusoidal in shape;
  the generally sinusoidal shape of the track bracket defines a central raised portion that is flanked on either side by upturned portions;
  the third channel of the rail assembly includes downturned portions that engage with the upturned portions of the track bracket such that the seating assembly is vertically and horizontally retained to the rail assembly;
  the rollers of the seating assembly are positioned within an underside of the central raised portion of the track bracket; and
  the first channel further includes data connectors.

According to a second aspect of the present disclosure, a vehicle cabin configuring apparatus includes a rail assembly and a seating assembly. The rail assembly includes a first channel with data and power connectors and a second channel with a drive cable. The seating assembly includes a drive arm that is selectively engagable with the drive cable, locking pins that are selectively engagable with the rail assembly, and rollers that engage with a third channel of the rail assembly. Glide bars are positioned between the rail assembly and the seating assembly.

Embodiments of the second aspect of the present disclosure can include any one or a combination of the following features:
  the seating assembly further includes a track bracket that engages with the rail assembly and is generally sinusoidal in shape;
  the generally sinusoidal shape of the track bracket defines a central raised portion that is flanked on either side by upturned portions;
  the third channel of the rail assembly includes downturned portions that engage with the upturned portions of the track bracket such that the seating assembly is vertically and horizontally retained to the rail assembly;
  the rollers of the seating assembly are positioned within an underside of the central raised portion of the track bracket;
  the glide bars decrease a coefficient of friction between the seating assembly and the rail assembly; and
  the glide bars are coupled to the seating assembly such that the glide bars traverse the rail assembly with the seating assembly.

According to a third aspect of the present disclosure, a vehicle cabin configuring apparatus includes a rail assembly and a seating assembly. The rail assembly includes a first channel that has data and power connectors and a second channel that has a drive cable with first and second thicknesses distributed therealong. The seating assembly includes a drive arm that is selectively engagable with the drive cable, locking pins that are selectively engagable with the rail assembly, and rollers that engage with a third channel of the rail assembly. Glide bars are positioned between the rail assembly and the seating assembly.

Embodiments of the third aspect of the present disclosure can include any one or a combination of the following features:
  the drive arm engages with at least one section of the first thickness of the drive cable and at least one section of the second thickness of the drive cable; and
  the second thickness of the drive cable is greater than the first thickness of the drive cable, wherein the second thickness of the drive cable is a load-bearing section of the drive cable.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 7 is a cross-sectional view of the rail assembly, taken along line VII-VII of FIG. 6, according to one example and illustrating a drive arm engaging with the drive cable;

FIG. 8 is a cross-sectional view of the drive mechanism, taken along line VII-VII of FIG. 6, according to one example and illustrating an interaction between a motor, rotors, and the drive cable;

DETAILED DESCRIPTION OF THE PREFERRED EMBODIMENTS

Figure 2:
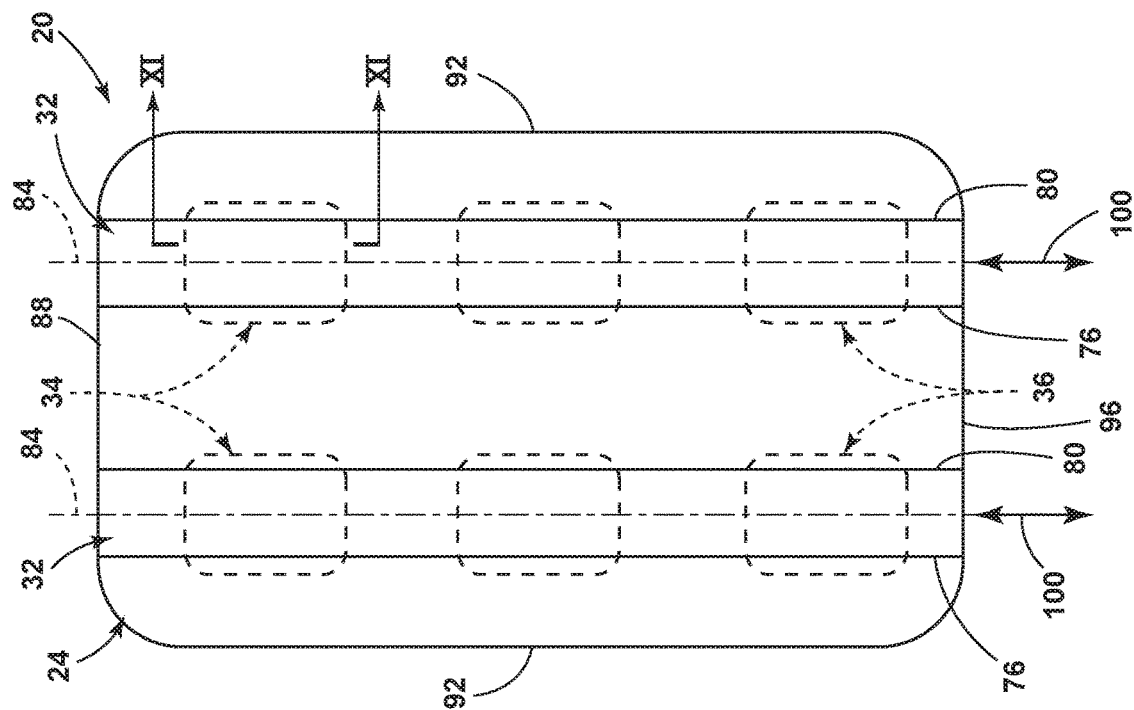
FIG. 2 is a top schematic view of the cabin of the vehicle, illustrating seating assemblies coupled to rail assemblies, according to one example.
Figure 1:
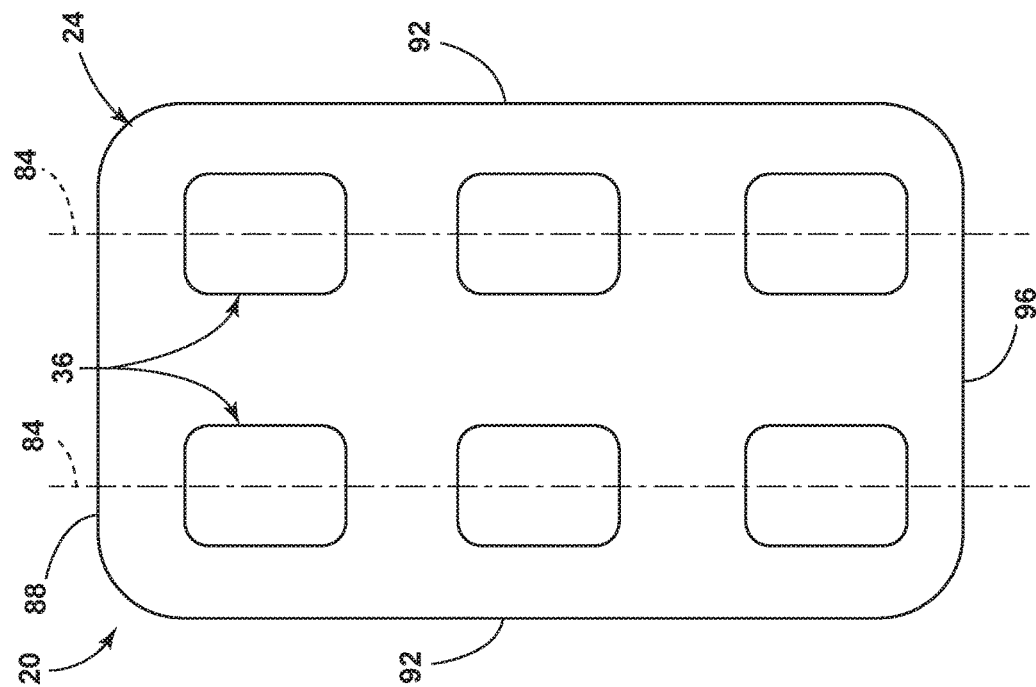
FIG. 1 is a top schematic view of a cabin of a vehicle, illustrating a seating arrangement, according to one example.
Figure 3:
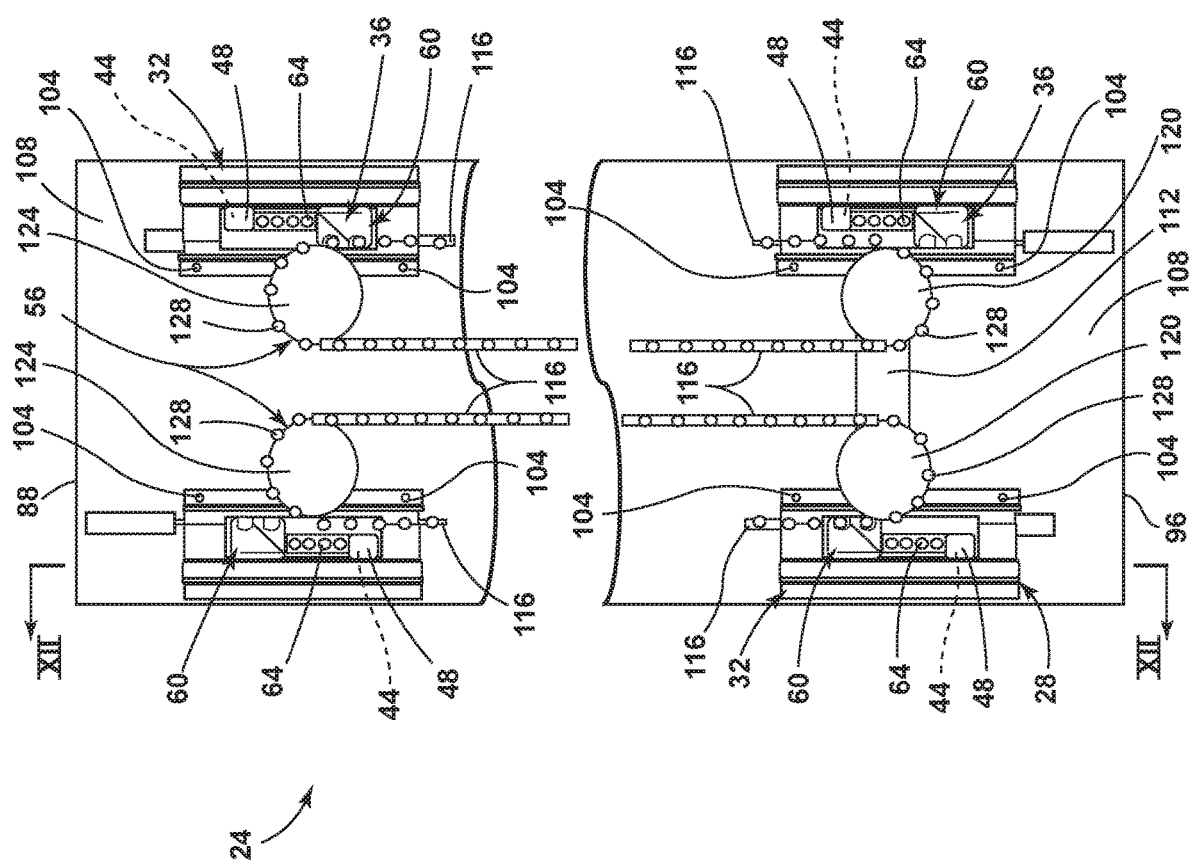
FIG. 3 is a top view of the rail assembly, according to one example, illustrating components of the seating assemblies that engage with the rail assembly and a drive cable.

For purposes of description herein, the terms "upper," "lower," "right," "left," "rear," "front," "vertical," "horizontal," and derivatives thereof shall relate to the concepts as oriented in FIG. 3. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a cabin configuring apparatus. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-14, a vehicle is generally designated by numeral 20. The vehicle 20 has a cabin 24 that is equipped with a cabin configuring apparatus 28. The cabin configuring apparatus 28 includes one or more rail assemblies 32 and one or more seating assemblies 36. The rail assembly 32 defines a first channel 40 that receives at least one of data connectors 44 and power connectors 48. In some examples, the data connectors 44 may be omitted in favor of a wireless data communication that can include, but is not limited to, near-field communication (NFC) and/or Bluetooth. The rail assembly 32 also defines a second channel 52 that receives a drive cable 56. The seating assembly 36 includes a drive arm 60 that is selectively engagable with the drive cable 56, locking pins 64 that are selectively engagable with the rail assembly 32, and rollers 68 that engage with a third channel 72 of the rail assembly 32.

Referring again to FIGS. 1 and 2, the cabin 24 of the vehicle 20 can be equipped with one or more of the rail assemblies 32. Each rail assembly 32 can include a first track 76 and a second track 80. The first track 76 and the second track 80 are generally parallel to one another and can extend along one or more axes of the vehicle 20. For example, the depicted example provides the first and second tracks 76, 80 as generally parallel to one another and having a centerline 84 that extends along a longitudinal axis of the vehicle 20. In various examples, the rail assemblies 32 can extend along longitudinal, lateral, and/or diagonal axes of the vehicle 20. Loading and unloading of the seating assemblies 36 relative to the rail assemblies 32 can be accomplished at a front 88, side 92, and/or rear 96 of the vehicle 20. For example, arrows 100 indicate a load and unload path of the seating assemblies 36 at the rear 96 of the vehicle 20. Loading and unloading of the seating assemblies 36 can enable a variety of uses for the vehicle 20, such as passenger vehicles during normal commute or waking times for users and as cargo vehicles during normal work or resting times for users. When the vehicle 20 is being used as a cargo vehicle, the seating assemblies 36 can be removed or replaced by containers, cabin dividers, and/or cabin partitions. The containers can be provided with a similar or identical engagement portion that interacts with the rail assembly 32 as the engagement portion disclosed herein with reference to the seating assembly 36.

Figure 4:
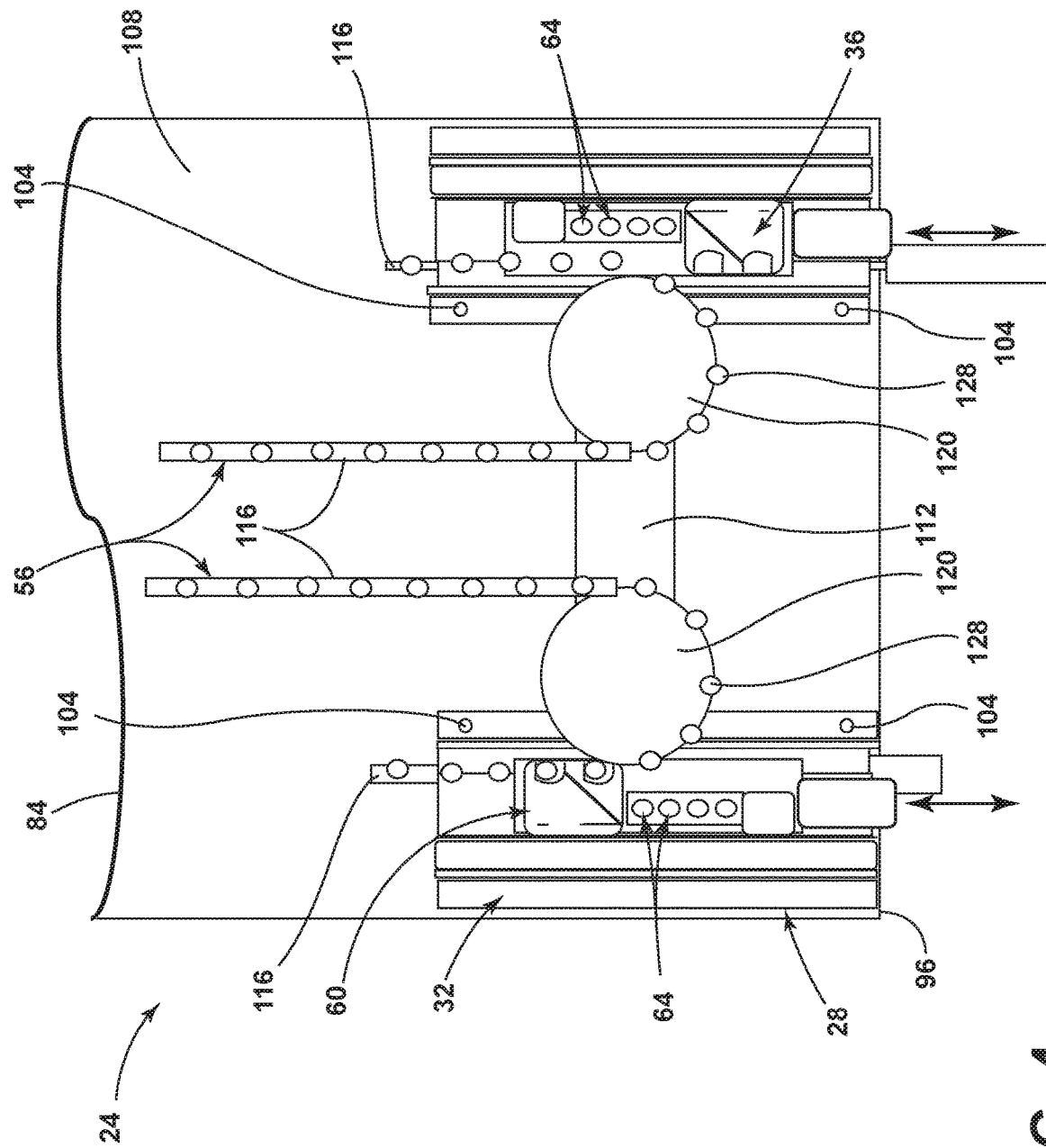
FIG. 4 is a top view of the components of the seating assembly that engage with the rail assembly and a drive mechanism for the drive cable, according to one example.

Referring now to FIGS. 3 and 4, each of the seating assemblies 36 engages with two rail assemblies 32 in a slidable and lockable fashion. Accordingly, safety and load distribution are improved as a result of the seating assemblies 36 being supported by a plurality of the rail assemblies 32. Each of the rail assemblies 32 is provided with the components that are utilized for actuating the seating assemblies 36 in a horizontal direction, the components utilized for locking the seating assemblies 36 to the rail assemblies 32, the components utilized for establishing and maintaining data connections, and the components utilized for establishing and maintaining power connections. The rail assemblies 32 define floor-mounting apertures 104 that are utilized to fasten the rail assemblies 32 to a floor 108 of the vehicle 20. In operation, the drive cables 56 on adjacent rail assemblies 32 that are coupled to a column of the seating assemblies 36, such as the pair of the rail assemblies 32 depicted in FIGS. 3 and 4, can be counter-rotated by a motor 112 that is positioned at the front 88 or the rear 96 of the vehicle 20. Accordingly, linear sections 116 of the drive cable 56 are synchronized in their motion along the rail assemblies 32 such that a concerted effort is undertaken by the cabin configuring apparatus 28 to translate the seating assembly 36 along the rail assemblies 32. The motor 112 is equipped with one or more rotors 120 that extend therefrom and engage with the drive cable 56 to transmit motion from the motor 112 to the drive cable 56. Each pair of rail assemblies 32 may be provided with one or more of the motors 112. In examples where a single motor 112 is utilized for each pair of rail assemblies 32, pulleys 124 can be provided at an opposing end of the rail assemblies 32 that permit rotational motion and do not interfere with the operation of the drive cable 56. It may be beneficial to utilize a single motor 112 per pair of rail assemblies 32 as the complexity and timing associated with two or more motors 112 being utilized per pair of rail assemblies 32 can increase the weight of the vehicle 20 and create opportunities for binding in the event of the motors 112 becoming out-of-sync. As the drive cable 56 engages with the rotors 120 of the motor 112, the linear sections 116 of the drive cable 56 transition into arcuate sections 128 that follow the curvature of the rotors 120.

Referring again to FIGS. 3 and 4, the portions of the seating assembly 36 that engage with the rail assembly 32 can be offset from one another. For example, the portions of the seating assembly 36 that engage with the rail assembly 32 can be mirror images of one another. The portions of the seating assembly 36 that engage with the rail assembly 32 include at least the data connectors 44, the power connectors 48, the drive arm 60, and the locking pins 64. In the depicted example, the locking pins 64 are positioned between the data and power connectors 44, 48 and the drive arm 60. Accordingly, on a first side of the seating assembly 36 (e.g., the left side) the data and power connectors 44, 48 can be positioned closer to the rear 96 of the vehicle 20 while the drive arm 60 is positioned closer to the front 88 of the vehicle 20. On a second side of the seating assembly 36 (e.g., the right side) the data and power connectors 44, 48 can be positioned closer to the front 88 of the vehicle 20 while the drive arm 60 is positioned closer to the rear 96 of the vehicle 20. It may be beneficial to arrange the portions of the seating assembly 36 that engage with the rail assembly 32 in such a manner so as to enable greater actuation of the seating assembly 36 along the rail assembly 32 while maintaining a coupled arrangement of the data and power connectors 44, 48 with the rail assembly 32. Said another way, as the seating assembly 36 actuates toward the front 88 of the vehicle 20, the drive arm 60 disengages from the drive cable 56 due to the pulleys 124 being positioned vehicle-rearward of a front edge of the rail assembly 32, however, the data and power connectors 44, 48 are positioned vehicle-rearward from the drive arm 60 on the first side of the seating assembly 36 such that the data and power connectors 44, 48 remain coupled to the rail assembly 32 after the drive arm 60 has disengaged from the drive cable 56. On the second side of the seating assembly 36, the drive arm 60 is positioned vehicle-rearward of the data and power connectors 44, 48 such that the drive arm 60 remains engaged with the drive cable 56 after the drive arm 60 on the first side of the seating assembly 36 has disengaged from the drive cable 56. The data and power connectors 44, 48 on the second side of the seating assembly 36 can remain coupled to the rail assembly 32 even after the drive arm 60 on the second side of the seating assembly 36 has disengaged from the drive cable 56. Alternatively, the data and power connectors 44, 48 on the second side of the seating assembly 36 can disengage with the rail assembly 32 before, or simultaneous with, the disengagement of the drive arm 60 from the drive cable 56.

Referring further to FIGS. 3 and 4, the mirrored or offset relationship of the first and second sides of the seating assembly 36 with respect to the configuration of the portions of the seating assembly 36 that engage with the rail assembly 32 enables a greater degree of driven actuation along the rail assembly 32 as well as a greater horizontal distance of connection of the data and power connectors 44, 48 along the rail assembly 32. The mirrored or offset relationship enables the greater actuation and the greater horizontal length of connection at both ends (e.g., front and rear) of the rail assembly 32. Specifically, as the seating assembly 36 is actuated to the front 88 of the vehicle 20, the drive arm 60 on the left side of the seating assembly 36, as depicted, disengages from the drive cable 56 as the drive arm 60 draws even with and passes the pulley 124 and the drive arm 60 on the right side of the seating assembly 36, as depicted, remains engaged with the drive cable 56 such that the seating assembly 36 can continue horizontal motion along the rail assembly 32 toward the front 88 of the vehicle 20. After the drive arm 60 has disengaged with the drive cable 56 on the left side of the seating assembly 36, the data and power connectors 44, 48 on the left side of the seating assembly 36 remain coupled to data and power connectors 44, 48 that are provided on the rail assembly 32. Additionally, the data and power connectors 44, 48 on the left side of the seating assembly 36 remain coupled to the data and power connectors 44, 48 on the rail assembly 32 after the drive arm 60 on the right side of the seating assembly 36 disengages from the drive cable 56. Accordingly, power is provided to the seating assembly 36 independent of whether or not the seating assembly 36 is in a location that is capable of engaging with the drive cable 56 such that a user can adjust settings of the seating assembly 36 that include, but are not limited to, backrest tilt angle, heating of the seating assembly 36, cooling or ventilation of the seating assembly 36, and various other comfort settings. Additionally, a data connection can be maintained between the vehicle 20 and the seating assembly 36 independent of whether or not the seating assembly 36 is in a location that is capable of engaging with the drive cable 56 such that various data can be obtained about the seating assembly 36 that includes, but is not limited to, a position of the seating assembly 36 within the vehicle 20, an occupied or unoccupied status of the seating assembly 36, and various other data that can be provided by the seating assembly 36.

Referring still further to FIGS. 3 and 4, as the seating assembly 36 is actuated to the rear 96 of the vehicle 20, the drive arm 60 on the right side of the seating assembly 36, as depicted, disengages from the drive cable 56 as the drive arm 60 draws even with and passes the rotor 120 and the drive arm 60 on the left side of the seating assembly 36, as depicted, remains engaged with the drive cable 56 such that the seating assembly 36 can continue horizontal motion along the rail assembly 32 toward the rear 96 of the vehicle 20. After the drive arm 60 has disengaged with the drive cable 56 on the right side of the seating assembly 36, the data and power connectors 44, 48 on the right side of the seating assembly 36 remain coupled to the data and power connectors 44, 48 that are provided on the rail assembly 32. Additionally, the data and power connectors 44, 48 on the right side of the seating assembly 36 remain coupled to the data and power connectors 44, 48 on the rail assembly 32 after the drive arm 60 on the left side of the seating assembly 36 disengages from the drive cable 56. Accordingly, power is provided to the seating assembly 36 independent of whether or not the seating assembly 36 is in a location that is capable of engaging with the drive cable 56 such that a user can adjust settings of the seating assembly 36 that include, but are not limited to, backrest tilt angle, heating of the seating assembly 36, cooling or ventilation of the seating assembly 36, and various other comfort settings. Additionally, a data connection can be maintained between the vehicle 20 and the seating assembly 36 independent of whether or not the seating assembly 36 is in a location that is capable of engaging with the drive cable 56 such that various data can be obtained about the seating assembly 36 that includes, but is not limited to, a position of the seating assembly 36 within the vehicle 20, an occupied or unoccu-pied status of the seating assembly 36, and various other data that can be provided by the seating assembly 36.

Figure 5:
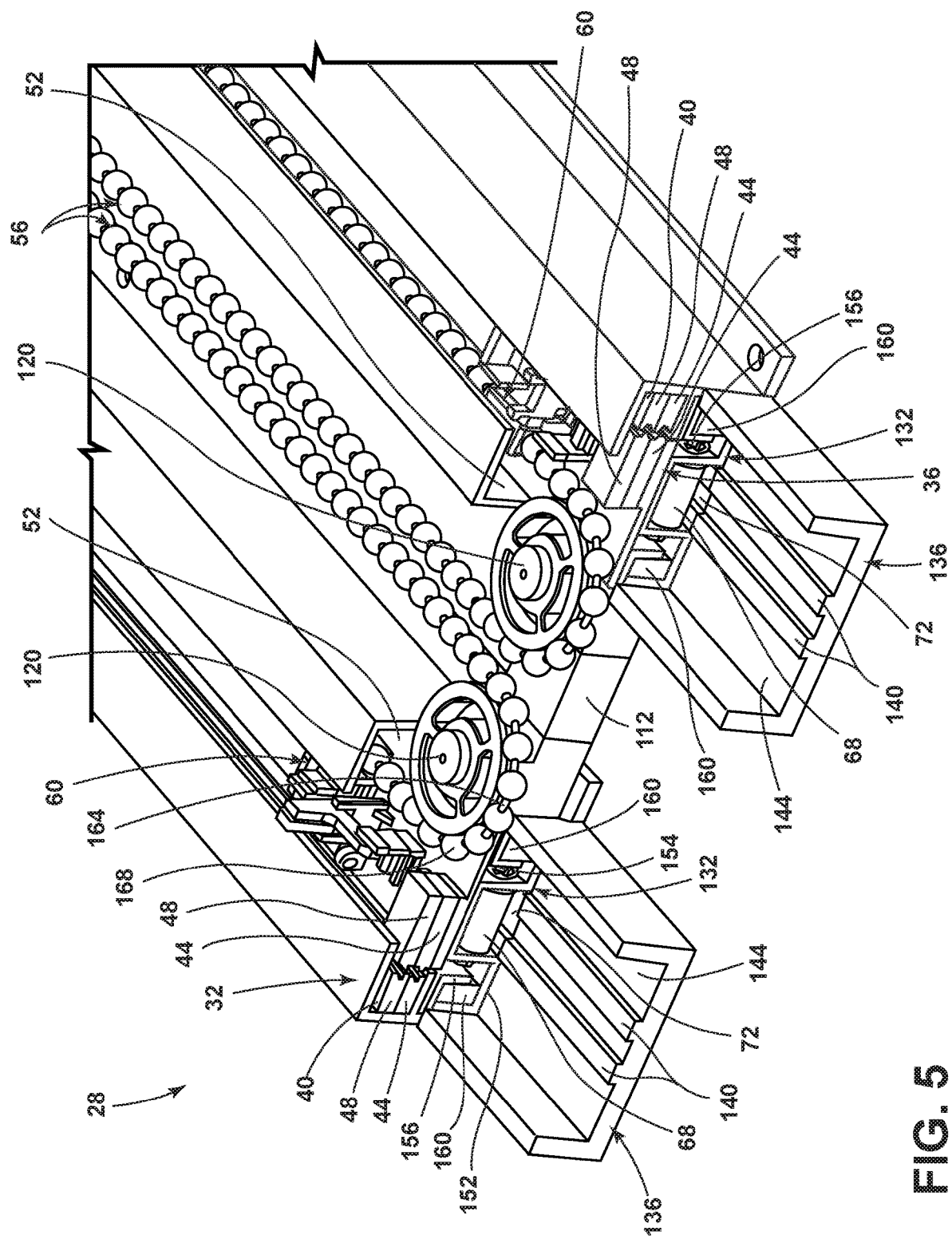
FIG. 5 is a side perspective view of the rail assembly, according to one example, illustrating the various components of the rail assembly.
Figure 6:
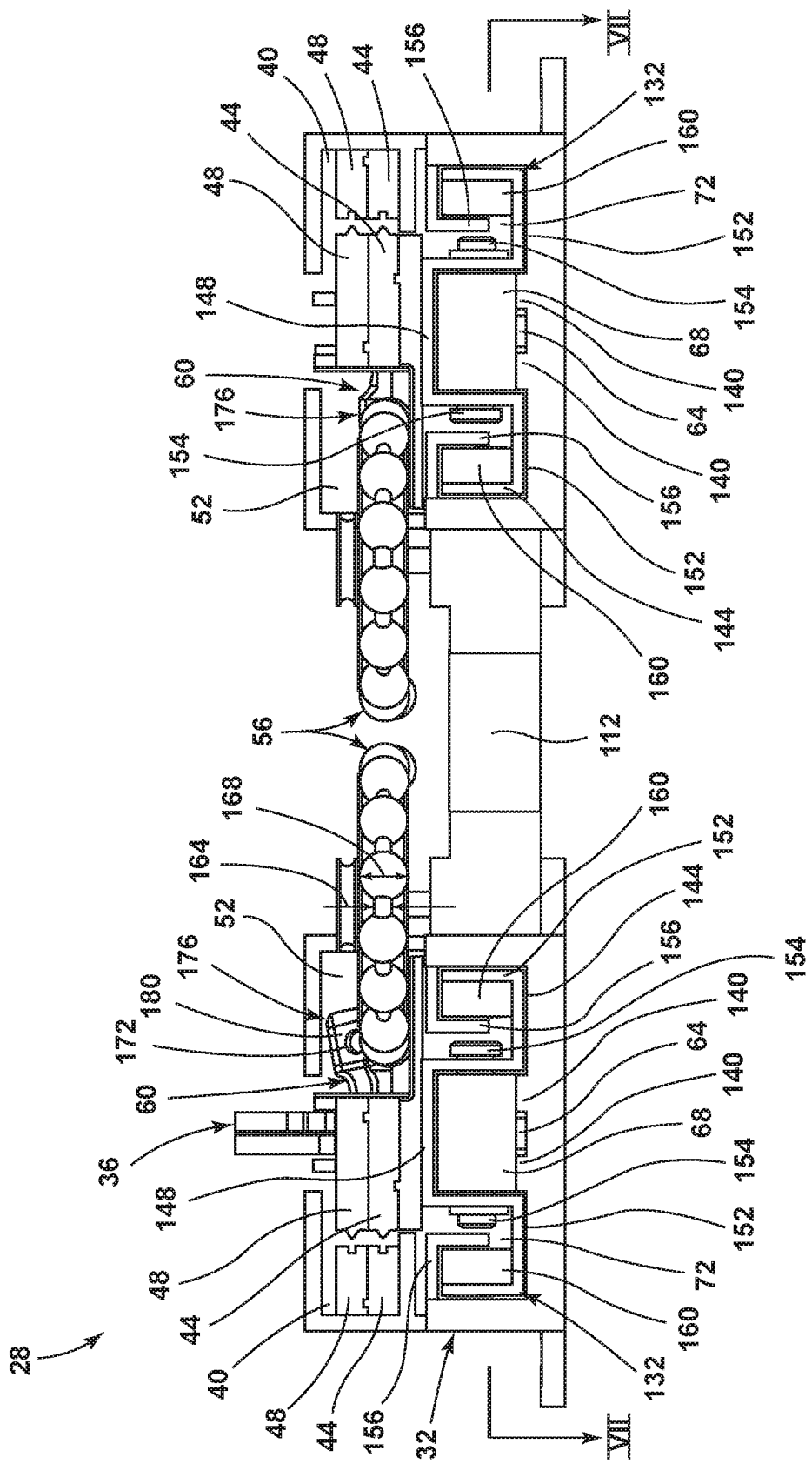
FIG. 6 is a front view of the rail assembly, according to one example, illustrating the various components of the rail assembly.

Referring to FIGS. 5-7, when the seating assembly 36 is loaded onto the vehicle 20, the rail assembly 32 receives a track bracket 132 of the seating assembly 36. The track bracket 132 can first engage with a rail end 136 of the rail assembly 32. The rail end 136 can be generally U-shaped with an open top such that initial coupling of the seating assembly 36 to the rail assembly 32 is not impeded by a ceiling or upper surface of the rail assembly 32. The rail assembly 32 may be equipped with one or more plateaus 140 that extend vertically upward from a central surface of the rail assembly 32 and extend along a length of the rail assembly 32 (e.g., a partial length, a substantial length, or an entire length of the rail assembly 32). In examples where a plurality of plateaus 140 are employed, such as that depicted, the plateaus 140 can be laterally spaced apart. Regardless of the number of plateaus 140 that are employed, the plateaus 140 may serve a variety of purposes. In one instance, the plateaus 140 can provide lateral retention forces to at least a portion of the track bracket 132. In another instance, the plateaus 140 can be utilized as an alignment aid when the seating assembly 36 is being coupled to the rail assembly 32. In yet another instance, the plateaus 140 can provide an engagement surface for the rollers 68 that enables the track bracket 132 to be suspended above a bottom engagement surface 144 of the third channel 72 such that friction is reduced between the seating assembly 36 and the rail assembly 32. By suspending the track bracket 132 above the bottom engagement surface 144 of the third channel 72, sliding friction is avoided and rolling friction is employed. Rolling friction tends to be much less than sliding friction. Accordingly, the seating assembly 36 is made easier to maneuver along the rail assembly 32 whether by manual actuation by a user or by powered actuation by the motor 112.

Referring again to FIGS. 5-7, the track bracket 132 engages with the rail assembly 32. The engagement between the track bracket 132 and the rail assembly 32 provides horizontal and vertical retention forces to the seating assembly 36 such that the seating assembly 36 remains coupled to the rail assembly 32. In the depicted example, the track bracket 132 is generally sinusoidal in shape. The generally sinusoidal shape of the track bracket 132 defines a central raised portion 148 that is flanked on either side by upturned portions 152. The central raised portion 148 can receive at least one of the rollers 68. For example, the rollers 68 of the seating assembly 36 can be positioned within an underside of the central raised portion 148 of the track bracket 132. Accordingly, the rollers 68 can be retained to the track bracket 132 and rotationally supported by an axle 154 that extends through the roller 68 and engages with the central raised portion 148 of the track bracket 132. The third channel 72 of the rail assembly 32 includes downturned portions 156 that engage with the upturned portions 152 of the track bracket 132. The downturned portions 156 and the upturned portions 152 can engage such that the seating assembly 36 is vertically and horizontally retained to the rail assembly 32. In various examples, one or more glide bars 160 can be positioned between the rail assembly 32 and the seating assembly 36. The glide bars 160 can decrease a coefficient of friction between the seating assembly 36 and the rail assembly 32. In one specific example, the glide bars 160 can be coupled to the seating assembly 36 such that the glide bars 160 traverse the rail assembly 32 with the seating assembly 36. Said another way, the glide bars 160 may be constantly co-localized with the seating assembly 36 throughout actuation of the seating assembly 36 along the rail assembly 32. For example, the glide bars 160 can be directly coupled to a surface of the upturned portions 152 of the track bracket 132. In alternative examples, the glide bars 160 can extend along the length of the rail assembly 32 with the glide bars 160 configured to be positioned between the track bracket 132 and at least a portion of the rail assembly 32. For example, the glide bars 160 can be coupled to the downturned portions 156 such that the glide bars 160 are positioned between the downturned portions 156 and the upturned portions 152. In such examples, the glide bars 160 may extend along a substantial portion of the length of the rail assembly 32.

Referring further to FIGS. 5-7, the drive cable 56 can be provided with a first thickness 164 and a second thickness 168. The first and second thicknesses 164, 168 can be alternately positioned along the length of the drive cable 56. Said another way, each section of the first thickness 164 can be flanked on either side by one of the sections of the second thickness 168 and each section of the second thickness 168 can be flanked on either side by one of the sections of the first thickness 164. The drive arm 60 engages with at least one section of the first thickness 164 of the drive cable 56 and at least one section of the second thickness 168 of the drive cable 56. The second thickness 168 of the drive cable 56 can be greater than the first thickness 164 of the drive cable 56. In various examples, the second thickness 168 of the drive cable 56 can be a load-bearing section of the drive cable 56. To facilitate engagement between the drive arm 60 and the drive cable 56, the drive arm 60 can be provided with one or more recesses 172 that are positioned in, and defined by, a head 176 of the drive arm 60. The recesses 172 are configured to receive one of the sections of the drive cable 56 that has the second thickness 168 in a manner that engages either side of the second thickness 168 section, or traps the second thickness 168, within the head 176 of the drive arm 60. When the drive cable 56 is actuated and the drive arm 60 is engaged with the drive cable 56, the section of the second thickness 168 contacts a wall 180 of the head 176 of the drive arm 60. The wall 180 transmits horizontal motion of the drive cable 56 into horizontal motion of the drive arm 60 and ultimately the seating assembly 36. It may be beneficial to provide the drive arm 60 with a plurality of the recesses 172 (e.g., two, three, four, etc.) to improve load distribution during the load-bearing events when the drive arm 60 is engaged with the drive cable 56. Additionally, providing a plurality of the recesses 172 can improve the chances of the recesses 172 capturing the second thickness 168 of the drive cable 56. In examples where a plurality of the recesses 172 are employed, the plurality of recesses 172 can be interconnected by tunnels or bridges that can correspond with the sections of the first thickness 164 of the drive cable 56 that interconnect the sections of the second thicknesses 168 of the drive cable 56 that are engaged by the recesses 172.

Referring now to FIG. 8, a relationship between the motor 112 and the rotors 120 is shown. The motor 112 is provided with one or more driveshafts 184 that extend in a lateral direction to transmit motion to the rotors 120. The rotors 120 are provided with axle rods 188 that extend from the rotors 120 toward the driveshaft 184 of the motor 112. The driveshaft 184 and the axle rods 188 can engage with a gear assembly that is positioned at a junction 192 between the driveshaft 184 and the axle rods 188. The gear assembly can be configured as a right-angle gear assembly where the rotational motion about a horizontal axis of the driveshaft 184 is transmitted into rotational motion about a vertical axis of the axle rods 188. Accordingly, rotational motion that is driven by the motor 112 can be transmitted to rotational motion of the rotors 120 and ultimately into lateral motion of the drive cable 56.

Figure 9:
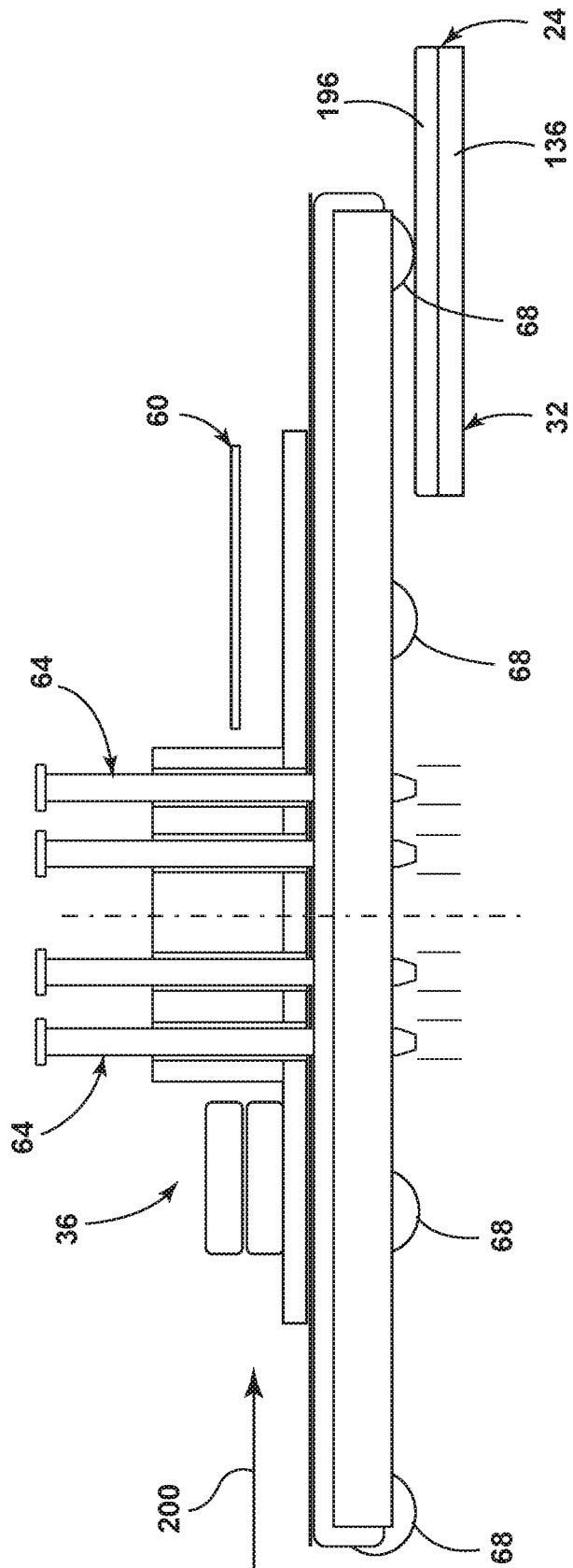
FIG. 9 is a side view of the seating assembly, illustrating a loading of the seating assembly into the cabin of the vehicle, according to one example.
Figure 10:
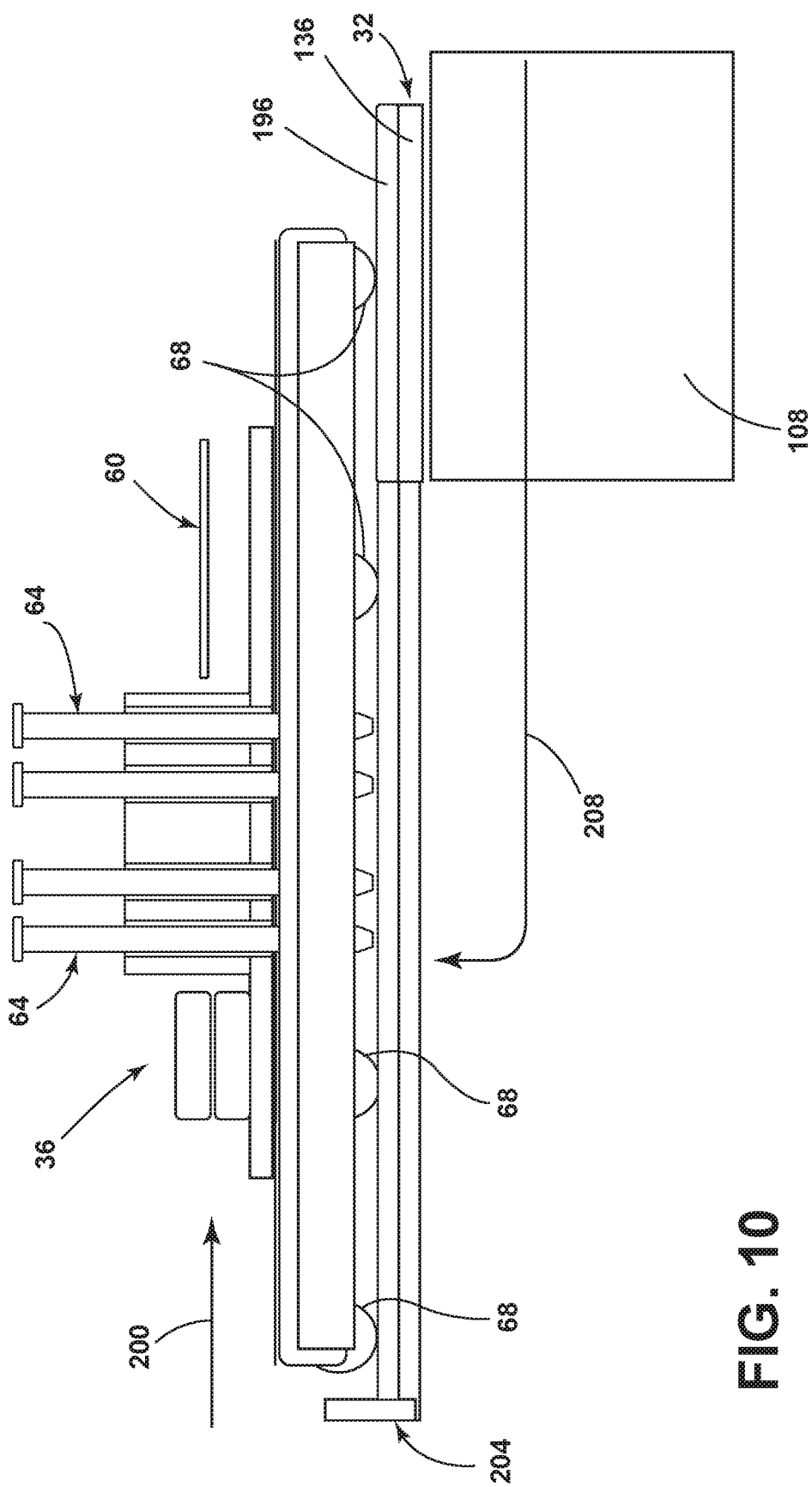
FIG. 10 is a side view of the seating assembly, illustrating the loading of the seating assembly into the cabin of the vehicle, according to another example.

Referring to FIGS. 9 and 10, the seating assembly 36 is shown being loaded into the cabin 24 of the vehicle 20 and onto the rail assembly 32. For example, the seating assembly 36 is being loaded onto the rail assembly 32 at the rail end 136. The rail assembly 32 can be provided with a wear strip 196 that the rollers 68 ride along. The wear strip 196 can be made of a material that engages with the rollers 68 in a low friction manner. The wear strip 196 can be provided as an easily replaceable component positioned on the rail assembly 32. For example, the wear strip 196 can be positioned on top of the one or more plateaus 140. A loading direction is indicated at arrow 200 and designates the direction that the seating assembly 36 is actuated along to transition from the seating assembly 36 being disengaged from the rail assembly 32 to the seating assembly 36 being engaged with the rail assembly 32. In some examples, the vehicle 20 can be provided with a loading table 204 that is actuatable from below the rail assembly 32. The loading table 204 can be stored in the floor 108 of the vehicle 20 and actuated to an extended position, as shown in FIG. 10, when the seating assembly 36 is being loaded onto the vehicle 20 or unloaded from the vehicle 20. The loading table 204 decreases an amount of physical exertion by a user in the loading and unloading process for the seating assembly 36. Deployment of the loading table 204 from a stowed position can be accomplished by at least two of horizontal, vertical, and rotational motion. In one example, the loading table 204 is deployed by sequential horizontal and vertical motion of the loading table 204, as indicated by arrow 208. In some examples, the loading table 204 can be provided as a component to a lift mechanism. The lift mechanism can be lowered to a height that is at or near ground level to allow the user to either roll or lift the seating assembly 36 onto the loading table 204 with a minimal amount of effort. Once the seating assembly 36 has been loaded onto the loading table 204, the lift mechanism can raise the loading table 204 to the position shown in FIG. 10 and the seating assembly 36 can be engaged with the rail assembly 32. In some examples, the loading and unloading of the seating assemblies 36 can be accomplished in an automated fashion with little to no input from a user.

Figure 11:
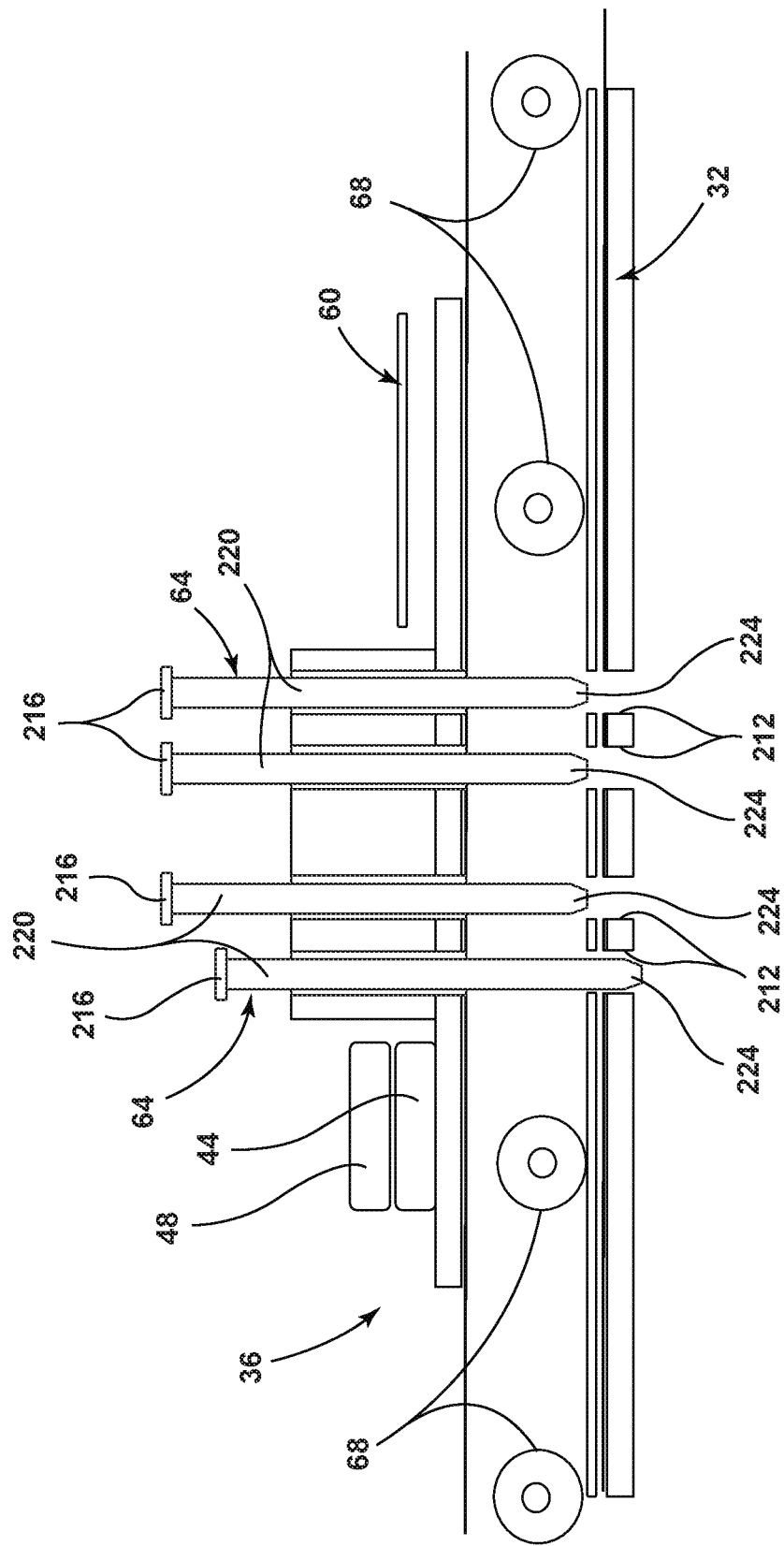
FIG. 11 is a cross-sectional view of the seating assembly, taken along line XI-XI of FIG. 2, illustrating an engagement between locking pins of the seating assembly and pin apertures in the rail assembly, according to one example.

Referring now to FIG. 11, the rail assembly 32 defines a plurality of pin apertures 212 that receive the locking pins 64. The pin apertures 212 can extend along the length of the rail assembly 32 such that the seating assembly 36 can be locked into a position along the rail assembly 32. In various examples, the pin apertures 212 can extend along a substantial portion of the length of the rail assembly 32 or the entire length of the rail assembly 32. The locking pins 64 are configured to have at least one of the locking pins 64 engage with the pin apertures 212 when the locking pins 64 are in a locked configuration. In the depicted example, four of the locking pins 64 are provided. However, it is contemplated that fewer or greater locking pins 64 can be employed without departing from the concepts disclosed herein. For example, three locking pins 64 may be employed or five locking pins 64 may be employed. By providing four locking pins 64 and having only one of the locking pins 64 engages with the pin apertures 212 at a time, a user may be presented with a seemingly infinite or continuous number of locking positions of the seating assembly 36 relative to the rail assembly 32. The seemingly infinite or continuous number of locking positions results from one of the locking pins 64 being capable of engaging with one of the pin apertures 212 at a given position such that the incremental changes of the position of the seating assembly 36 relative to the rail assembly 32 is limited by the proximity or spacing of the locking pins 64 relative to one another. The locking pins 64 are provided with a cross-member 216 that is position in perpendicular relationship to a pin shaft 220. The pin shafts 220 include a tapered end 224 that is opposite the cross-member 216. The tapered end 224 allows the locking pins 64 to engage with the pin apertures 212 even when the locking pins 64 and the pin apertures 212 are slightly offset from one another in the horizontal direction. The cross-members 216 prevent the locking pins 64 from being permitted to actuate too far into the pin apertures 212 while also providing a surface that can be engaged by a release mechanism to raise the locking pin(s) 64 out of the pin aperture(s) 212. For example, the release mechanism can engage with an underside surface of the cross-member 216 such that actuation of the release mechanism induces vertical motion of the locking pin 64 until the locking pin 64 is no longer engaged with the pin aperture 212.

Figure 12:
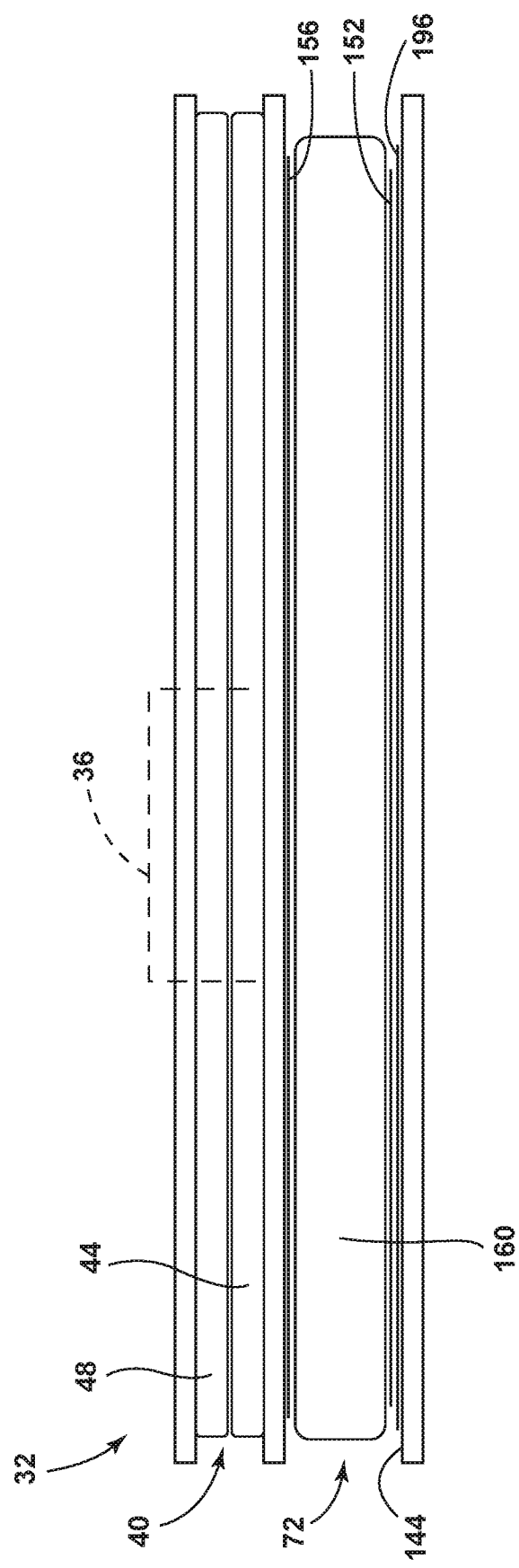
FIG. 12 is a cross-sectional view of the rail assembly and the seating assembly coupled to one another, taken along line XII-XII of FIG. 3, illustrating interactions between various components of the seating assembly and the rail assembly, according to one example.
Figure 13:
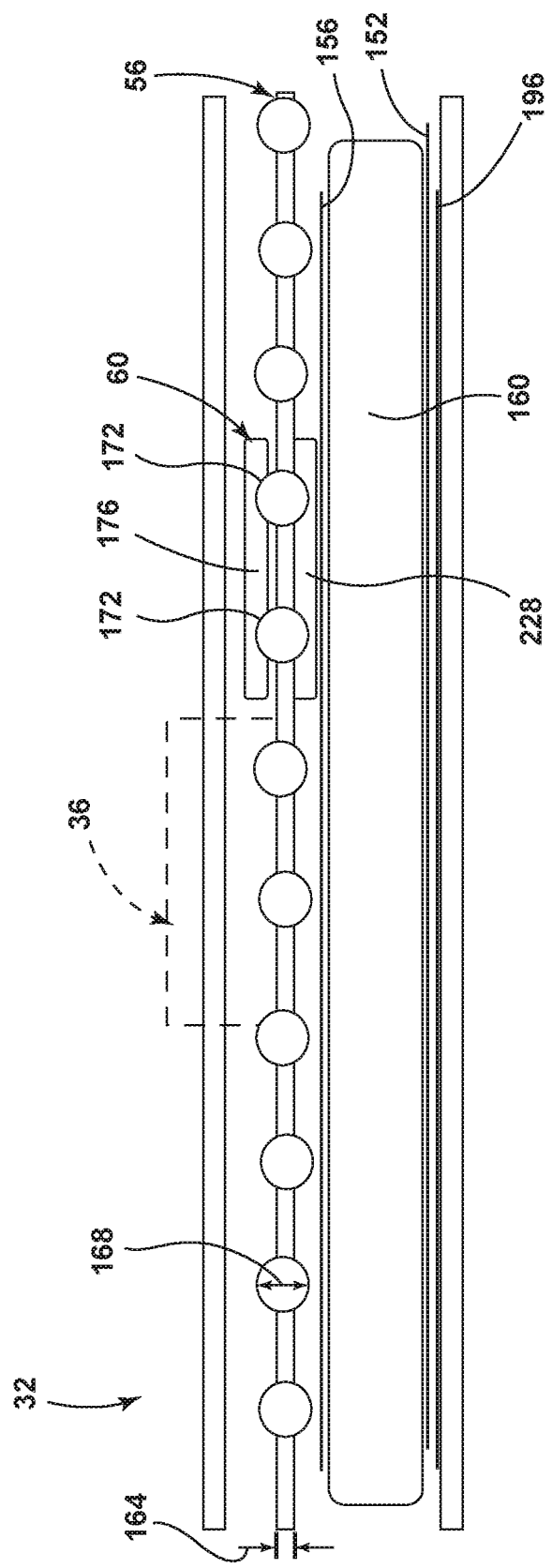
FIG. 13 is a cross-sectional view of the rail assembly and the seating assembly coupled to one another, taken along line XII-XII of FIG. 3, according to one example and illustrating an engagement between the drive arm and the drive cable.

Referring to FIGS. 12 and 13, the rail assembly 32 is shown in a cross-sectional view taken along line XII-XII of FIG. 3, according to one example. The seating assembly 36 is coupled to the rail assembly 32 and is represented by phantom lines. In the depicted example, the glide bars 160 extend along a substantial portion or an entirety of the length of the rail assembly 32. The glide bars 160 are positioned between the upturned portions 152 of the track bracket 132 and the downturned portions 156 of the rail assembly 32. In the depicted example, the glide bars 160 can be directly coupled to the downturned portions 156 of the rail assembly 32. The wear strip 196 can be positioned between the upturned portions 152 and the bottom engagement surface 144 of the third channel 72. The data and power connectors 44, 48 are positioned within the first channel 40. The data and power connectors 44, 48 extend along a substantial portion or an entirety of the length of the rail assembly 32. The first and second thicknesses 164, 168 of the drive cable 56 alternate along the length of the drive cable 56. In the depicted example of FIG. 13, the drive arm 60 is configured to engage with a plurality of the sections of the first and second thicknesses 164, 168. The drive cable 56 can be sandwiched or clamped between the head 176 of the drive arm 60 and an arm plate 228 of the drive arm 60. The arm plate 228 is positioned below the head 176 of the drive arm 60 and may contain complementary structures to the recesses 172 in the head 176. The complimentary structures to the recesses 172 are positioned on the opposite side of the drive cable 56 from the recesses 172 and are configured to engage with the drive cable 56 in a similar manner. In some examples, the arm plate 228 is a substantially planar structure that is not equipped with the complimentary structures to the recesses 172 in the head 176 of the drive arm 60. Accordingly, the drive cable 56 can be sandwiched between the head 176 and the arm plate 228 with the recesses 172 in the head 176 providing physical retention of the drive cable 56 by physical interference between the drive cable 56 and the drive arm 60. The arm plate 228 can provide frictional retention of the drive cable 56 in such an example.

Figure 14:
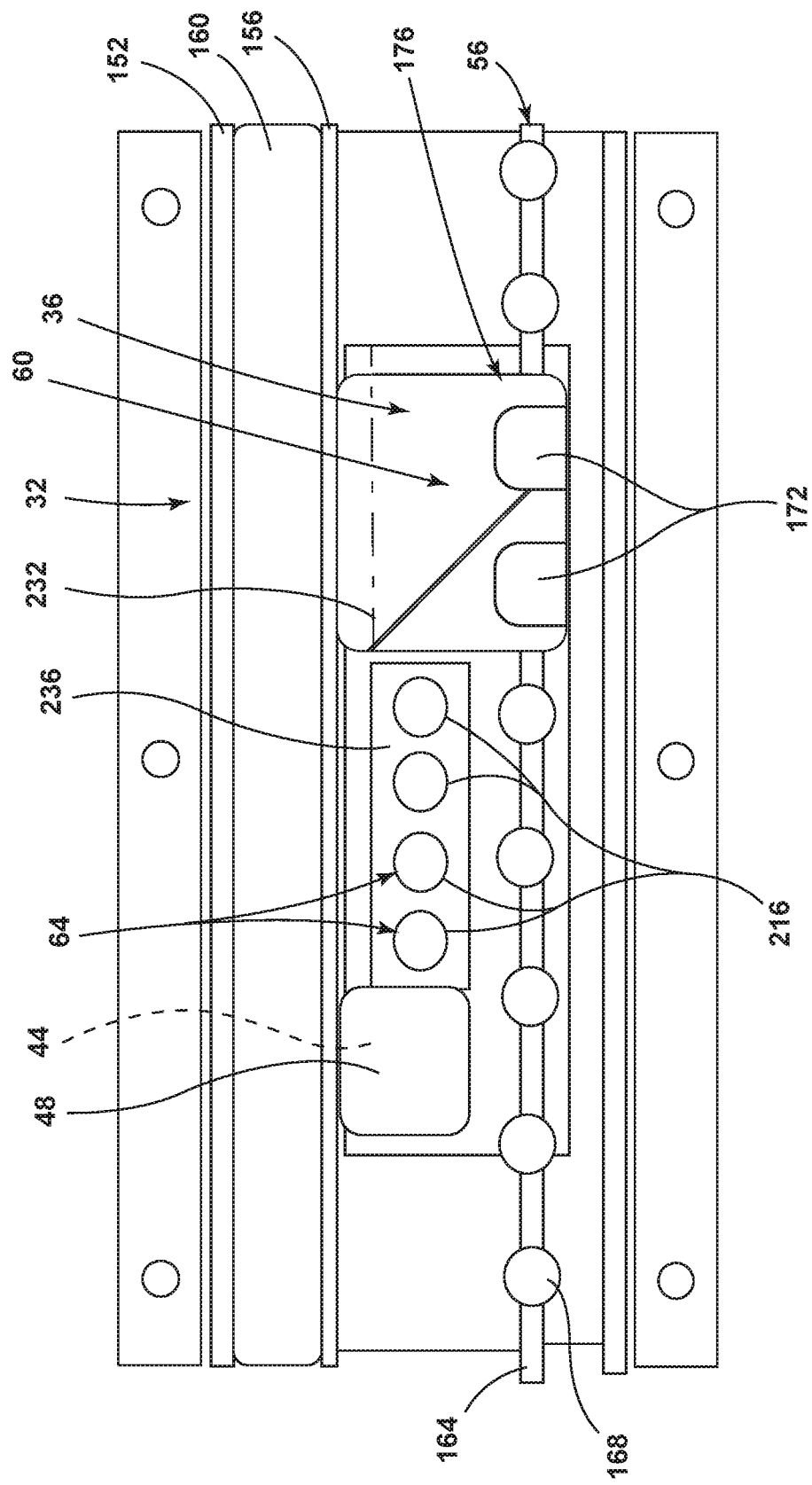
FIG. 14 is a top view of some of the components of the seating assembly that engage with the rail assembly, according to one example and illustrating the engagement between the drive arm and the drive cable.

Referring now to FIG. 14, the drive arm 60 is shown with two of the recesses 172 in the head 176 of the drive arm 60. The recesses 172 are in an engaged position with the drive cable 56 such that lateral motion of the seating assembly 36 may be induced. As described above, the recesses 172 can engage with the first and/or second thicknesses 164, 168 of the drive cable 56. To move between the engaged position and a disengaged position, the head 176 of the drive arm 60 can be rotated or pivoted about a pivot axis 232. The pivot axis 232 can extend in the same direction as the rail assembly 32 and be positioned on an opposite side of the drive arm 60 from the recesses 172. The glide bar 160 can be seen positioned between the upturned portion 152 of the track bracket 132 and the downturned portion 156 of the rail assembly 32. The cross-members 216 of the locking pins 64 can extend above a housing 236 that receives the locking pins 64. When the locking pins 64 are actuated between raised and lowered positions, the locking pins 64 move in a vertical direction within the housing 236. When the seating assembly 36 has reached a desired position, the drive arm 60 disengages from the drive cable 56 and the locking pins 64 engage with the rail assembly 32. Accordingly, the locking pins 64 carry impact loads in the event of a vehicle-to-vehicle impact, a vehicle-to-object impact, and/or cargo-to-seating-assembly impacts. The drive cable 56 is not utilized to carry impact loads in the event of the vehicle-to-vehicle impact, the vehicle-to-object impact, and/or the cargo-to-seating-assembly impacts.

With the development of vehicles 20, especially autonomous vehicles, new challenges have been realized with the normal operation of the autonomous vehicles. For example, one challenge includes the configuring of the cabin 24 of the vehicle 20 when no occupants are present to execute the configuring. Accordingly, the present disclosure provides one or more examples of solutions to the autonomous configuring of the cabin 24 of the vehicle 20 that can also be adjusted by a user that is physically occupying the cabin 24. Additionally, the present disclosure provides for the autonomous transition of the vehicle 20 between a passenger vehicle to a cargo vehicle and back again. Accordingly, the vehicle 20 may have less "down-time" when the vehicle 20 is not being utilized and can result in fewer vehicles 20 being needed on the roads.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle cabin configuring apparatus, comprising:
   a rail assembly, comprising:
     a first channel comprising power connectors;
     a second channel comprising a drive cable; and
   a seating assembly comprising:
     a drive arm selectively engagable with the drive cable;
     locking pins selectively engagable with the rail assembly; and
     rollers that engage with a third channel of the rail assembly.

2. The vehicle cabin configuring apparatus of claim 1, further comprising:
   glide bars positioned between the rail assembly and the seating assembly, wherein the glide bars decrease a coefficient of friction between the seating assembly and the rail assembly.

3. The vehicle cabin configuring apparatus of claim 2, wherein the glide bars are coupled to the seating assembly such that the glide bars traverse the rail assembly with the seating assembly.

4. The vehicle cabin configuring apparatus of claim 1, wherein the drive cable comprises a first thickness and a second thickness alternately positioned therealong.

5. The vehicle cabin configuring apparatus of claim 4, wherein the drive arm engages with at least one section of the first thickness of the drive cable and at least one section of the second thickness of the drive cable.

6. The vehicle cabin configuring apparatus of claim 4, wherein the second thickness of the drive cable is greater than the first thickness of the drive cable, and wherein the second thickness of the drive cable is a load-bearing section of the drive cable.

7. The vehicle cabin configuring apparatus of claim 1, wherein the seating assembly further comprises a track bracket that engages with the rail assembly and is generally sinusoidal in shape.

8. The vehicle cabin configuring apparatus of claim 7, wherein the generally sinusoidal shape of the track bracket defines a central raised portion that is flanked on either side by upturned portions.

9. The vehicle cabin configuring apparatus of claim 8, wherein the third channel of the rail assembly comprises downturned portions that engage with the upturned portions of the track bracket such that the seating assembly is vertically and horizontally retained to the rail assembly.

10. The vehicle cabin configuring apparatus of claim 8, wherein the rollers of the seating assembly are positioned within an underside of the central raised portion of the track bracket.

11. A vehicle cabin configuring apparatus, comprising:
    a rail assembly, comprising:
      a first channel comprising data and power connectors;
      a second channel comprising a drive cable;
    a seating assembly comprising:
      a drive arm selectively engagable with the drive cable;
      locking pins selectively engagable with the rail assembly;
      rollers that engage with a third channel of the rail assembly; and
    glide bars positioned between the rail assembly and the seating assembly.

12. The vehicle cabin configuring apparatus of claim 11, wherein the seating assembly further comprises a track bracket that engages with the rail assembly and is generally sinusoidal in shape.

13. The vehicle cabin configuring apparatus of claim 12, wherein the generally sinusoidal shape of the track bracket defines a central raised portion that is flanked on either side by upturned portions.

14. The vehicle cabin configuring apparatus of claim 13, wherein the third channel of the rail assembly comprises downturned portions that engage with the upturned portions of the track bracket such that the seating assembly is vertically and horizontally retained to the rail assembly.

15. The vehicle cabin configuring apparatus of claim 13, wherein the rollers of the seating assembly are positioned within an underside of the central raised portion of the track bracket.

16. The vehicle cabin configuring apparatus of claim 11, wherein the glide bars decrease a coefficient of friction between the seating assembly and the rail assembly.

17. The vehicle cabin configuring apparatus of claim 11, wherein the glide bars are coupled to the seating assembly such that the glide bars traverse the rail assembly with the seating assembly.

18. A vehicle cabin configuring apparatus, comprising:
    a rail assembly, comprising:
      a first channel comprising data and power connectors;
      a second channel comprising a drive cable with first and second thicknesses distributed therealong;
    a seating assembly comprising:
      a drive arm selectively engagable with the drive cable;
      locking pins selectively engagable with the rail assembly;
      rollers that engage with a third channel of the rail assembly;

glide bars positioned between the rail assembly and the seating assembly.

19. The vehicle cabin configuring apparatus of claim 18, wherein the drive arm engages with at least one section of the first thickness of the drive cable and at least one section of the second thickness of the drive cable.

20. The vehicle cabin configuring apparatus of claim 18, wherein the second thickness of the drive cable is greater than the first thickness of the drive cable, and wherein the second thickness of the drive cable is a load-bearing section of the drive cable.

* * * * *